United States Patent
Bruno et al.

(10) Patent No.: US 6,178,813 B1
(45) Date of Patent: Jan. 30, 2001

(54) VIBRATION DISTORTION REMOVAL FOR SCANNING PROBE MICROSCOPES

(75) Inventors: John D. Bruno, Bowie; Donald E. Wortman, Rockville; John L. Bradshaw, Elkridge; Romel D. Gomez, Silver Spring, all of MD (US)

(73) Assignee: The United States of America as represented by the Secretary of the Army, Washington, DC (US)

( * ) Notice: Under 35 U.S.C. 154(b), the term of this patent shall be extended for 0 days.

(21) Appl. No.: 09/441,894

(22) Filed: Nov. 17, 1999

(51) Int. Cl.[7] .............................. G01B 5/28; G01B 9/02; H01J 37/20
(52) U.S. Cl. ..................... 73/105; 250/306; 250/307; 356/354; 356/493
(58) Field of Search .......................... 73/105; 250/306, 250/307; 356/345, 354, 356, 358, 493

(56) References Cited

U.S. PATENT DOCUMENTS

| | | | |
|---|---|---|---|
| 5,206,702 | * 4/1993 | Kato et al. | 250/306 |
| 5,304,924 | * 4/1994 | Yamano et al. | 250/306 |
| 5,438,206 | * 8/1995 | Yokoyama et al. | 250/306 |
| 5,825,670 | * 10/1998 | Chernoff et al. | 73/105 |
| 5,999,005 | * 12/1999 | Fuji et al. | 324/750 |

* cited by examiner

*Primary Examiner*—Hezron Williams
*Assistant Examiner*—Michael Cygan
(74) *Attorney, Agent, or Firm*—Paul S. Clohan, Jr.; William E. Eshelman

(57) ABSTRACT

A method for improving images of surface features of a sample, constructed by a scanning probe microscope, includes constructing images of surface features of a sample with a scanning probe microscope; measuring a displacement of the sample that occurs during the constructing step; and correcting the images using the measured displacement. An apparatus for improving images of surface features of a sample, constructed by a scanning probe microscope, includes a vacuum chamber; a sample holder disposed in the vacuum chamber; at least one spring connected between the vacuum chamber and the sample holder; at least one magnet disposed in the vacuum chamber for damping vibrations of the sample holder; a probe and piezo tube assembly disposed in the vacuum chamber for scanning surface features of a sample; and an interferometer disposed in the vacuum chamber wherein the interferometer measures a distance between the sample and a point fixed with respect to the sample.

7 Claims, 3 Drawing Sheets

VIBRATION DISTORTION REMOVAL FOR SCANNING PROBE MICROSCOPES

BACKGROUND OF THE INVENTION

The invention relates in general to removing noise signals that reduce the quality of surface images constructed by a measuring instrument such as a scanning probe microscope (SPM). In particular, the invention relates to improving the quality of signals generated by a scanning tunneling microscope (STM), where the features of a surface are being measured on an atomic scale in the presence of vibration that affects the distance between the sample and probe.

The development of the STM in 1981 (see G. Binning, H. Rohrer, C. Gerber, and E. Weibel, Phys. Rev. Lett. 49, 57 (1982); Phys. Rev. Lett. 40, 178 (1982); Physica 109/110 b, 2075 (1982)) spawned the invention of a family of SPMs (see R. Wiesendanger, "Scanning Probe Microscopy and Spectroscopy", Cambridge University Press, 1994), which makes use of numerous interactions between a measuring probe and a material surface. Devices and structures which are investigated by SPM techniques have become increasingly smaller.

For SPM resolutions on an atomic scale, precise probe control and superior vibration isolation are necessary to obtain high fidelity signals. For example, to obtain a vertical resolution of 0.01 Å in an STM requires a stability of the tip-to-sample spacing at the level of 0.001 Å in conventional STMs. Therefore, vibration isolation is paramount for the successful operation of an STM or other measuring apparatus where high resolution is required.

Numerous studies have investigated ways to lessen the effects of vibration while making measurements and the theories of feedback and vibration isolation for SPMs in general. These studies have focused on damping systems for vibration isolation where the sources of vibration are external to the compartment in which the measurement is being made. For example, S. Park and C. F. Quate, Rev. Sci. Instrum. 58 (11), 2004, (1987) investigated several models of vibration isolation, one of which uses a spring and magnetic damping system as shown in FIG. 1, which is typical for SPMs.

In FIG. 1, the measuring tip and the sample under investigation are contained in box 50. The spring 52 and magnetic damper 54 function to reduce vibration of the box 50. It is the displacement, x, that Park and Quate sought to minimize. However, it is the uncontrolled variations of the displacement between the tip and the sample, which occurs inside the box 50, that degrades the image of the sample features. The uncontrolled variations of the displacement between the tip and the sample is typically caused by vibrations.

Most STM systems employ spring supports and magnetic damping as shown in FIG. 1. Some STMs are even floated on air tables and isolated from accompanying apparatus, such as molecular beam epitaxy machines, so they can resolve surface features on an atomic scale. The present invention eliminates such extreme measures for vibration isolation so that SPM measurements can be made with atomic resolution. The present invention allows more rugged SPMs (a class to which STM belongs) to be built that, for example, can be taken from laboratories for use in field tests where vibration would render a conventional SPM useless.

SUMMARY OF THE INVENTION

It is an object of the invention to provide a means to detect any probe-to-sample displacement in SPM type measurements so that the measured surface features are not degraded by motion between the measuring probe and the sample surface (e.g. motion caused by vibrations).

It is another object of the invention to either store or immediately use the detected displacement to correct for distortion in the data being collected that describes the surface features.

It is a further object of the invention to provide surface feature data with reduced distortion caused by vibration affecting the probe to sample distance.

Further objects, features and advantages of the invention will become apparent from the following detailed description taken in conjunction with the drawing.

DETAILED DESCRIPTION OF THE PREFERRED EMBODIMENTS

The present invention encompasses a method and apparatus for improving images of surface features of a sample. The images are constructed by a scanning probe microscope (SPM). The method and apparatus detect small displacements between the sample and a stationary point, for example, the fixed base of a scanning probe. The stationary point is at a fixed position with respect to the sample surface while the measurements of surface features are being made with the probe. The displacement information is used to correct data that describe surface features as the data are being collected, or the displacement information can be stored in a computer file for use after the sample surface has been measured by the probe.

In either case, more robust SPMs which require less sophisticated vibration isolation systems can be built. Using the present invention, surface measurements can be made at the atomic scale and the method can be extended to correct three dimensional data.

Figure 1:
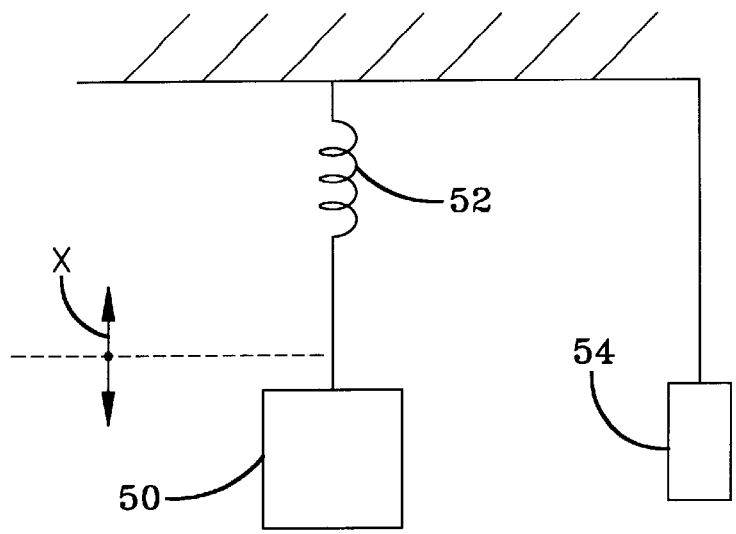
FIG. 1 schematically shows an example of how external vibrations have been dealt with in the construction of SPMs.
Figure 2:
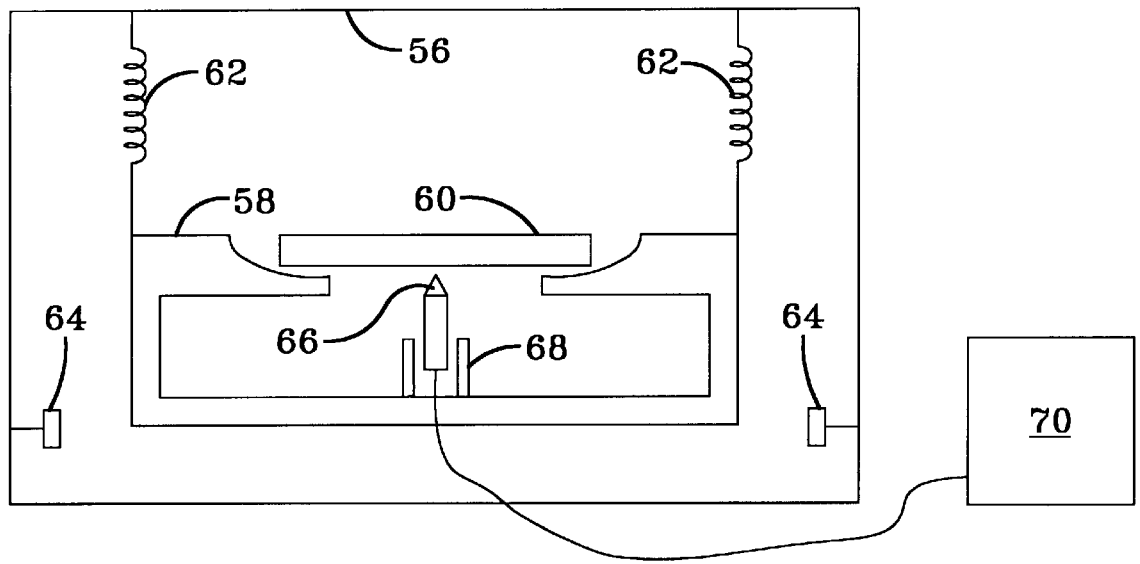
FIG. 2 is a schematic diagram of a typical STM head, which contains a sharp tipped probe and a sample, that is capable of resolving features on an atomic scale when used in an ultra high vacuum (UHV) environment ($10^{-10}$ to $10^{-11}$ Torr).

FIG. 2 schematically shows a known STM head. An ultra high vacuum chamber 56 contains a sample holder 58 and a sample 60. It is the surface features of the sample 60 that are desired to be measured. The sample holder 58 is supported in the chamber 56 by springs 62 and magnets 64, which provide vibration damping. A sharp tipped probe 66 is held in position and scanned via the piezo tube assembly 68. The signal from the probe 66 is sent to a data processor 70. The data processor 70 transforms the signal from the probe 66 into images of the surface features of the sample 58.

Figure 3:
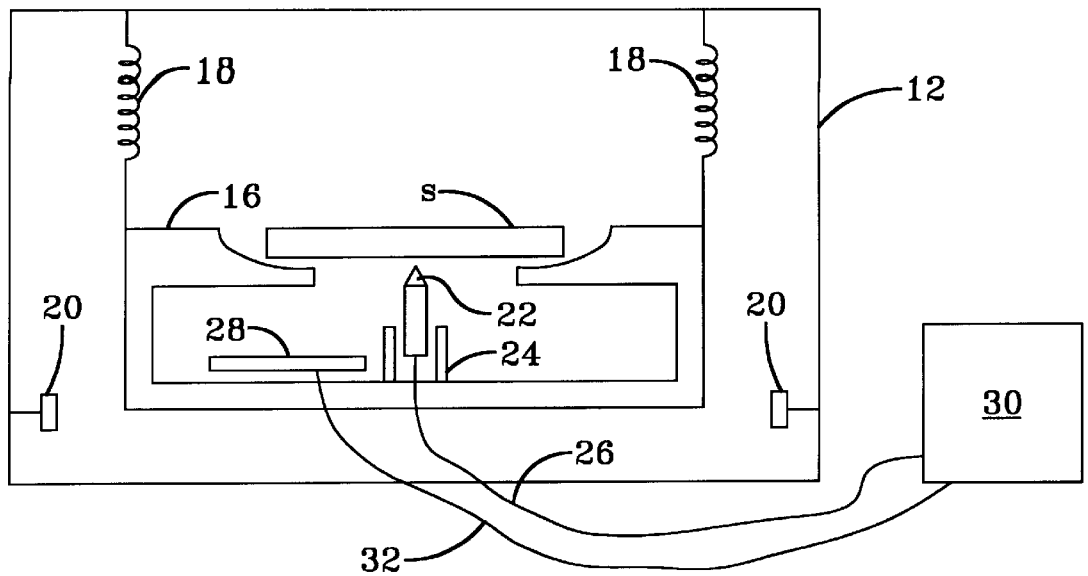
FIG. 3 is a schematic diagram of an embodiment of the invention.

FIG. 3 schematically shows one embodiment of the invention. A sample holder 16 and a sample s are disposed within a vacuum chamber 12. Preferably, the vacuum chamber is an ultra high vacuum chamber providing a vacuum of $10^{-10}$ to $10^{-11}$ Torr. The sample s is held rigidly in the sample holder 16. Springs 18 and magnets 20 provide vibration damping. The sharp tipped probe 22 is held in position and scanned via the piezo tube assembly 24.

Wires that carry power to drive the scanning tube 24 are not shown nor are the control/drive or sampling electronics. The sampling electronics may include an amplifier that amplifies the probe signal and carries information via the tip cable 26 through the vacuum chamber wall. The tip cable 26 is connected to a data processor 30. An interferometer 28 is mounted on the base of the chamber 12 using, for example, an adhesive. An interferometer cable 32 is also connected through the vacuum chamber wall to the data processor 30.

Figure 4:
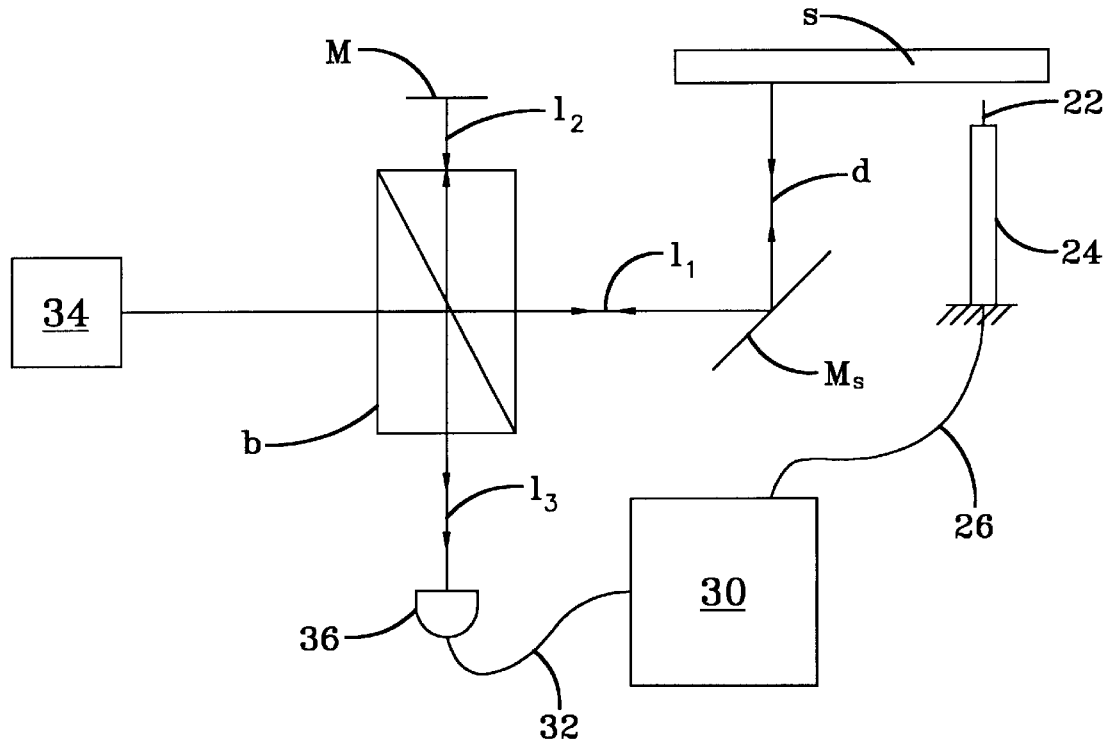
FIG. 4 is an enlarged schematic diagram of an interferometer.

FIG. 4 is an enlarged schematic diagram of the interferometer 28. A laser 34 emits a coherent light beam which is directed toward a beam splitter, b. The electric field amplitude carried by this beam is $E_o e^{i(kz-\omega t)}$, where $k=2\pi/\lambda$, $\lambda$ is the wavelength of the light, z is the propagation distance, $\omega$ is the angular frequency of the light, and t is the time.

Part of the light is directed along path $l_1$ and the other part is directed along path $l_3$. The light passing along path $l_1$ is directed onto a mirror, $M_s$, which reflects the beam upward along path d toward the sample s, which is vibrating. This beam is reflected off the sample and is directed down along path d toward $M_s$ where it is then directed back along path $l_1$ toward b. The beam returning from the sample and the mirror $M_s$ is again split at b where part of this light is sent upward along path $l_2$ to a highly reflecting mirror M. Highly reflecting means that the mirror reflects at least 90% of the radiation having the frequency of interest. M can be coated onto b so that $l_2$ is small. The light that continues along $l_1$ through b can be isolated from the laser so that it causes no harmful effects.

The light that is reflected back along $l_2$, which has also reflected off the sample s, rejoins the light that came directly from the laser 34. These beams are sent along $l_3$ to a detector 36 where the beams interfere. It is this interference signal that describes the motion of the sample s with respect to the stationary mirror $M_s$.

The data processor 30 constructs images of surface features of the sample s using the information provided by the probe 22 and piezo tube 24. The interference signal from the detector 36 is sent via the interferometer cable 32 to the data processor 30. The data processor 30 uses the interference signal to measure the displacement of the sample that occurs while the probe 22 is generating the signal used to construct images of the surface features of the sample. The data processor 30 uses the measured displacement of the sample s to correct the images of the surface features of the sample.

The electric field amplitude, $E_T$, of the light which is present at the detector 36 is given as follows:

$$E_T = E_0 t_b^2 r_{Ms}^2 r_s r_b r_M e^{ik[2l_1+2d+2l_2+l_3]} + E_0 r_b e^{ikl_3} \quad (1)$$

where $t_b$ is the amplitude of the transmitted wave through the beam splitter, b; $r_j$ is the amplitude of the wave reflected off the $j^{th}$-optical element; $l_j$ is the path length for the path $l_j$; and d is the distance between the fixed point (mirror $M_s$) and the sample s, where d may be varying because of vibrational or other effects.

Equation (1) can be rewritten as:

$$E_T = E_0 t_b e^{ikl_3}[1+T_b R_{Ms} R_s^{1/2} R_M^{1/2} e^{e(2kd+\Theta)}] \quad (2)$$

where $\Theta = 2k(l_1+l_2)+2(\phi_b+\phi_{Ms})+\phi_s+\phi_M$; $t_b = T_b^{1/2} e^{i\Phi_b}$; and $r_j = R_j^{1/2} e^{i\phi_j}$ for the $j^{th}$-element. The voltage produced by a detector is determined from the square of (2).

For example, the voltage signal produced by a photodiode is proportional to the intensity, which is:

$$I_T = I_0 R_b[1+T_b^2 R_{Ms}^2 R_S R_M + 2T_b R_{MS} R_s^{1/2} R_M^{1/2} \cos(2kd+\Theta)] \quad (3)$$

where $I_0=|E_0|^2 2\eta$ and $\eta$ is 376.7 ohms. Also, the voltage is proportional to the power incident on the detector; i.e. $V_O = CP_T$ where C is a constant that can be determined. However, in order to determine the minimum change in d that can be determined, we need to calculate $\Delta P/P$ which is:

$$\Delta P/P = 8\pi T_b R_{Ms} R_s^{1/2} R_M^{1/2} \Delta d / (\lambda[1+T_b^2 R_{Ms}^2 R_S R_M]) \quad (4)$$

Solving equation (4), we get:

$$\Delta d = \frac{\lambda[1+T_b^2 R_{Ms}^2 R_S R_M]}{8\pi T_b R_{Ms} R_s^{1/2} R_M^{1/2}} \frac{\Delta P}{P} \quad (5)$$

For computational purposes, we find that when using realistic numbers (e.g. $T_b=0.5$, $R_{Ms}=1$, $R_S=0.3$, $R_M=1$), $\Delta d \approx 0.154\lambda \Delta P/P$ which yields a value for $\Delta d=2$ Å for values of $\lambda=5000$ Å and $\Delta P/P=0.25\%$. Detection of considerably smaller displacements can readily be made by using systems employing mode locked lasers or using other laser systems with improved power stability.

Figure 5:
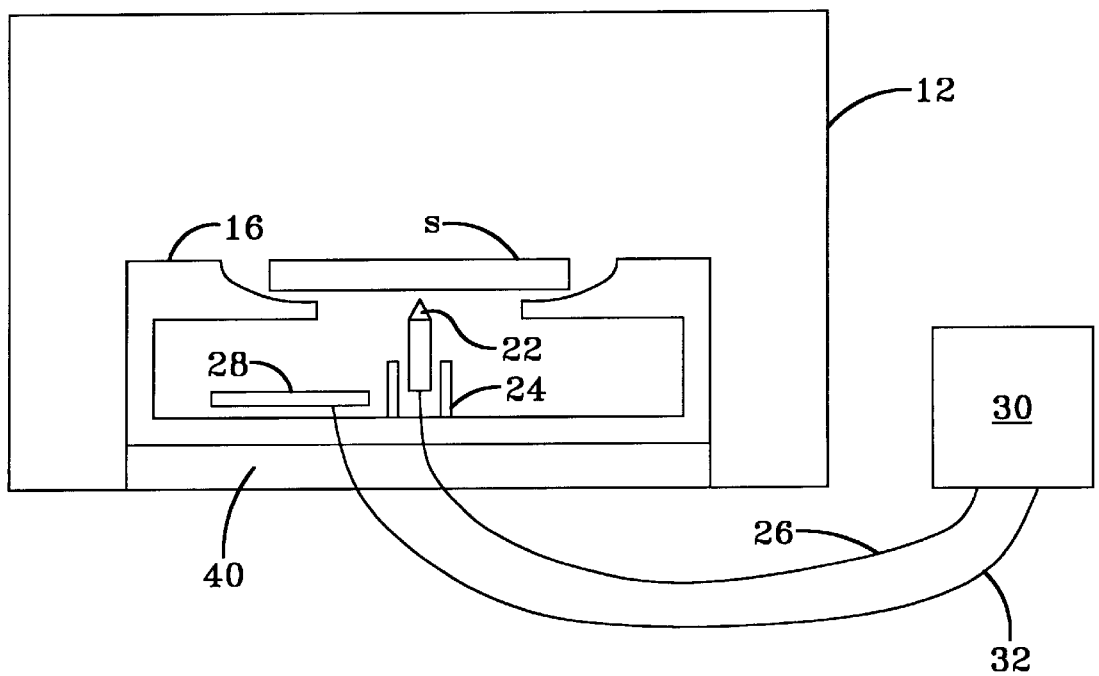
FIG. 5 is a schematic diagram of another embodiment of the invention.

FIG. 5 is a schematic diagram of another embodiment of the invention. The embodiment of FIG. 5 is similar to the embodiment of FIG. 3. However, in the embodiment of FIG. 5 there are no springs 18 or magnets 20. The embodiment of FIG. 5 includes a support 40 between the bottom of the vacuum chamber 12 and the sample holder 16. The support 40 functions to dampen vibrations. The support 40 is made of vibration damping material suitable for the vacuum environment, such as viton. The remaining features of the embodiment of FIG. 5 function as explained with respect to the embodiment of FIG. 4.

Other possible embodiments to detect a sample to probe displacement that is caused by vibration (or any other mechanism that causes a displacement of the probe tip-to-sample distance) can be used rather than employing a single laser/detector system. Additional light paths and separate detectors may be used to determine vibrational motion in the plane of the surface of the material being examined and, thereby, used to correct the data collected that are used to construct surface features of the sample.

Other embodiments need not have a laser/detector system. For example, a probe, such as a second STM tip or an atomic force microscopy (AFM) tip, can be held in place near where the surface features are being measured. A displacement of the sample caused by a mechanism such as vibration of the sample will be measured by the ATM or second STM tip and used to correct the scanning data which are being collected. In addition, the method can be extended to the detection of motion in the plane of the sample surface with respect to the measuring probe tip.

While the invention has been described with reference to certain preferred embodiments, numerous changes, alterations and modifications to the described embodiments are possible without departing from the spirit and scope of the invention, as defined in the appended claims and equivalents thereof.

What is claimed is:

1. An apparatus comprising;

a vacuum chamber;

a sample holder disposed in the vacuum chamber;

at least one spring connected between the vacuum chamber and the sample holder;

at least one magnet disposed in the vacuum chamber for damping vibrations of the sample holder;

a probe and piezo tube assembly disposed in the vacuum chamber for scanning surface features of a sample;

an interferometer disposed in the vacuum chamber wherein the interferometer measures a distance between the sample and a point fixed with respect to the sample; and a data processor connected to the probe and piezo tube assembly and the interferometer;

wherein the interferometer comprises a laser, a beam splitter, first and second mirrors and a detector; and wherein a light beam emitted by the laser is split by the beam splitter into paths $1_1$, and $1_3$; a light beam passing along path $1_1$ is directed to the first mirror and reflected along path d to the sample where it is reflected off the sample back to the first mirror and back along path $1_1$ to the beam splitter where it is split again into a first part and a second part; the first part follows path $1_2$ to a second mirror where the first part is reflected back to the beam splitter and then along path $1_3$ to the detector; the second part is isolated from the laser; at the beam splitter the first part rejoins a part of the light beam directly emitted by the laser that follows path $1_3$ to the detector where the first part and the part of the light beam directly emitted by the laser interfere.

2. The apparatus of claim 1 wherein the second mirror comprises a coating on the beam splitter.

3. The apparatus of claim 1 wherein the first mirror comprises a highly reflecting mirror.

4. An apparatus comprising;

a vacuum chamber;

a support disposed on a bottom of the vacuum chamber;

a sample holder disposed on the support;

a probe and piezo tube assembly disposed in the vacuum chamber for scanning surface features of a sample;

an interferometer disposed in the vacuum chamber wherein the interferometer measures a distance between the sample and a point fixed with respect to the sample; and a data processor connected to the probe and piezo tube assembly and the interferometer;

wherein the interferometer comprises a laser, a beam splitter, first and second mirrors and a detector; and wherein a light beam emitted by the laser is split by the beam splitter into paths $1_1$ and $1_3$; a light beam passing along path $1_1$ is directed to the first mirror and reflected along path d to the sample where it is reflected off the sample back to the first mirror and back along path $1_1$ to the beam splitter where it is split into a first part and a second part; the first part follows path $1_2$ to a second mirror where the first part is reflected back to the beam splitter and then along path $1_3$ to the detector; the second part is isolated from the laser; at the beam splitter the first part rejoins a part of the light beam directly emitted by the laser that follows path $1_3$ to the detector where the first part and the part of the light beam directly emitted by the laser interfere.

5. The apparatus of claim 4 wherein the the second mirror comprises a coating on the beam splitter.

6. The apparatus of claim 4 wherein the first mirror comprises a highly reflecting mirror.

7. A method for improving images of surface features of a sample, constructed by a scanning probe microscope, comprising:

constructing images of surface features of a sample with a scanning probe microscope;

measuring a displacement of the sample that occurs during the constructing step; and correcting the images using the measured displacement;

wherein the displacement is measured using an interferometer; and wherein the measuring step comprises:

emitting a light beam from a laser;

splitting the light beam into paths $1_1$ and $1_3$;

passing a portion of the light beam along path $1_1$ to a first mirror and reflecting it along a path d to the sample where it is reflected off the sample back to the first mirror and then back along path $1_1$ to the beam splitter; then splitting the portion of the light beam into a first part and a second part; the first part following path $1_2$ to a second mirror where it is reflected back to the beam splitter and then along path $1_3$ to the detector;

isolating the second part of the portion of the light beam from the laser; and at the beam splitter, combining the first part of the portion of the light beam with another portion of the light beam directly emitted by the laser that follows path $1_3$ to the detector where the first part and the another portion of the light beam directly emitted by the laser interfere.

* * * * *